Patented Oct. 7, 1941

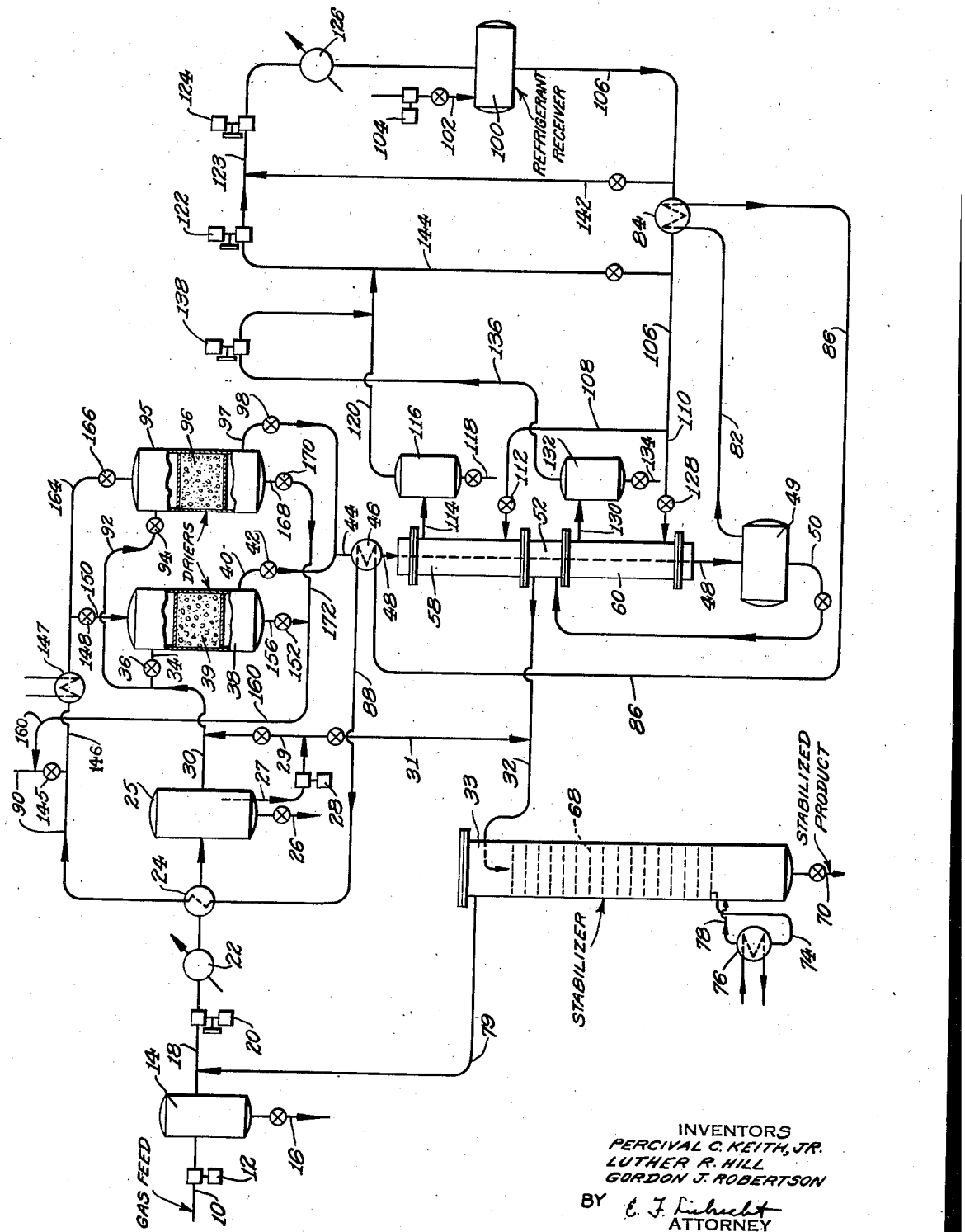

2,258,015

UNITED STATES PATENT OFFICE 2,258,015

SEPARATING HYDROCARBON FLUIDS

Percival C. Keith, Jr., Peapack, Luther R. Hill, Radburn, and Gordon J. Robertson, Westfield, N. J., assignors to The M. W. Kellogg Company, New York, N. Y., a corporation of Delaware Application May 23, 1939, Serial No. 275,176

19 Claims. (Cl. 62—175.5)

This invention relates to the treatment of gaseous hydrocarbon mixtures to separate desired hydrocarbon constituents therefrom and more particularly relates to recovering natural gasoline from natural gas, or recovering a desired $C_3$—$C_4$ hydrocarbon fraction from hydrocarbon gases.

A feed gas containing hydrocarbons is compressed and cooled, preferably above the freezing point of water to prevent the formation of solid gas hydrates. At the same time some of the water and heavier hydrocarbons are condensed and removed as liquids. The condensed heavier hydrocarbons may be pumped into the cooled gas ahead of the drier to be described presently or may be pumped into the stabilizer later to be described. The cooled gas is then passed through a drier to remove substantially all of the water from the cooled gas and the cooled and dried gas is then passed through a series of coolers or heat exchangers to reduce the temperature of the gas to a relatively low temperature so as to liquefy the desired higher molecular weight hydrocarbons. By removing the water, ice formation in the later stages of the process is prevented. In this process high pressures are avoided and the feed gas is compressed to a relatively low pressure so that expensive compression stages are avoided.

In passing through the series of heat exchangers, the cooled and dried gas is first passed through one heat exchanger or cooler in indirect contact with cold tail gas or residue gas which is leaving the system and which is at a relatively low temperature. In this heat exchanger some of the heavier or higher molecular weight constituents of the gas are liquefied. The partially condensed and cooled gas being treated is then passed through another heat exchanger or cooler where it is indirectly contacted with an expanded refrigerant where further liquefaction of the cooled gas takes place. The cooled gas is then passed through another heat exchanger or cooler where it is indirectly contacted with liquid condensate obtained by cooling the dried gas to a relatively low temperature below the freezing point of water as will be presently described. The liquid condensate is at a relatively low temperature and the gas passing through the heat exchangers is further cooled. The cooled gas is then passed through the last heat exchanger or cooler wherein it is indirectly contacted with another portion of expanded refrigerant. In this last stage the gas is cooled to a relatively low temperature and substantially all of the remaining desired higher molecular weight hydrocarbons are liquefied. The last mentioned refrigerant is expanded to a lower pressure than the previously mentioned refrigerant so that a greater degree of refrigeration is obtained. The expanded refrigerants are compressed and cooled and returned to a common receiver.

The cooled gases and liquid or liquefied constituents are passed to a separator wherein gases are separated from liquid. The liquid is withdrawn from the separator and is passed through one of the heat exchangers as above described and then passed or introduced into the upper portion of the stabilizer which is maintained under a relatively low pressure. In the stabilizer the desired liquefied constituents are stabilized to remove undesired volatile constituents and the stabilized products are withdrawn from the bottom of the stabilizer. The gases or vapors passing overhead from the stabilizer are mixed with the feed gas and recycled through the process.

The cooled and dried gas in passing through the heat exchangers is cooled in two of the heat exchangers by indirect contact with a refrigerant as above described. The cooled refrigerant is expanded in the first heat exchanger to cool the gas in the first cooling stages. In the second heat exchanger where refrigerant is used, the refrigerant is expanded to a lower pressure in order to cool the gas to a lower temperature and after this second cooling by refrigerant the cooled gas and liquefied constituents are introduced into the separator as above described. By having two stages of expansion cooling by refrigerant a better cooling of the gas is obtained and a better separation of desired constituents is obtained. The refrigerant after each expansion is compressed and cooled and recycled through the heat exchangers or coolers for cooling additional quantities of gas.

In the drawing a diagrammatic showing is made of apparatus adapted to carry out a process according to our invention. While only one form of apparatus has been shown it is to be understood that other apparatus may be used.

Referring now to the drawing, the reference character 10 designates a line through which gaseous feed is passed. In describing the invention, reference will be made to a specific example but the invention is not to be restricted thereto as other feed stocks may be used and other operating conditions may be used. If the gaseous feed is under very low pressure, a pump 12 may be used to introduce the gaseous feed into a scrubber drum or drip drum 14 to remove any condensed or entrained liquids. If the gaseous feed is under suitable pressure, the feed may be introduced directly into the scrubber drum or drip drum 14 and pump 12 may be omitted. Hydrocarbon gases to be treated according to our invention include normally gaseous hydrocarbons containing relatively small amounts of higher molecular weight hydrocarbons. However, hydrocarbon gases or gaseous mixtures containing normally gaseous hydrocarbons such as refinery gas or the like may be used. Preferably natural gas containing $C_1$ to $C_5$ and higher hydrocarbons is treated in order to separate natural gasoline therefrom.

One gaseous mixture which may be treated according to this invention includes the following components and amounts,

|  | Mol percent | Pounds per hour |
| --- | --- | --- |
| $CH_4$ | 83.55 | 17,650 |
| $C_2H_6$ | 7.11 | 2,810 |
| $C_3H_8$ | 3.92 | 2,270 |
| $C_4H_{10}$ | 3.01 | 2,300 |
| $C_5H_{12}$ and higher | 2.41 | 2,290 |

To this gaseous mixture are added the vapors passing overhead from the stabilizer 33 as will be pointed out hereinafter.

In the drum 14 any entrained liquid is separated from the gas and may be removed through valved outlet line 16. The gas leaves the drum 14 and passes through line 18 and through compressor 20 where it is compressed to about 30 lbs. per square inch. Where the gas is under sufficient pressure, the compressor 20 may be omitted. During compression the gas becomes heated and it is necessary to cool the gas by passing it through cooler 22. In this cooler the gas is preferably cooled by water but other cooling means may be used. The compressed gas is cooled to about 100° F.

The thus cooled gas is passed through heat exchanger 24 where it is further cooled by indirect contact with cold tail gas or gas which has been separated during the process and which is being discarded. After passing through the heat exchanger 24 the gas is cooled to about 40° F. and introduced into drip drum 25 to separate any liquefied hydrocarbons and water from the gas. In this step the gas to be treated is preferably cooled to a temperature above the freezing point of water in order to prevent the formation of solid gas hydrates. At the same time a large percentage of the moisture is condensed and water is removed in this step. It is advantageous to remove as much water as is possible in this preliminary stage for the reason that there is less water or moisture left in the gas which is to be removed before refrigeration of the gas and the absorbing or drying agents in the driers later to be described have a longer life. Any liquid condensate and water may be removed from the bottom of the drip drum 25 through valved line 26.

Preferably, however, the liquid condensate forming the upper layer in drum 25 is withdrawn from drum 25 through line 27 and passed by pump 28 through valved line 29 and introduced into gas line 30 leaving the drum 25 or it may be passed through valved line 31 and introduced into the unstabilized feed passing through line 32 to stabilizer 33 later to be described in greater detail.

The cooled and partially dried gas then leaves the drip drum 25 and together with any liquid condensate introduced through line 29 is passed through line 30 and line 34 provided with a valve 36 and is introduced into the upper portion of a drier 38 for removing substantially all the remaining moisture or water vapor in the gas and water in the introduced liquid condensate. The drier 38 is provided with a drying or absorbing agent 39 for absorbing water or moisture from the gas before further cooling the gas. Various absorbing or drying agents may be used, such as alumina, silica gel, etc., but preferably alumina is used. The dried gas is withdrawn from the bottom of drier 38 through line 40 provided with a valve 42 and is then in condition for being further cooled and refrigerated to low temperatures in order to separate desired hydrocarbon constituents therefrom. The temperatures which are used are below the freezing point of water and it is, therefore, necessary to remove substantially all the water from the gas in order to prevent formation of ice in the cooling stages.

The dried gas under a pressure of about 30 lbs. per square inch is then passed through line 44 and heat exchanger 46 where it is indirectly contacted with cold tail gas and the dried gas to be treated has its temperature reduced to about 0° F. During this cooling a portion of the dried gas including higher molecular weight hydrocarbons is liquefied. The tail gas before it passes through the heat exchanger 46 is at a temperature of about —30° F. and when it leaves the heat exchanger 46 it has a temperature of about +20° F.

The partially cooled gas and liquefied constituents are then passed through line 48 and through a series of heat exchangers as will be presently described, to reduce the temperature of the gas to about —68° F. to liquefy substantially all the desired constituents. The liquefied constituents and uncondensed gas are then introduced into a separating drum 49 to separate liquefied constituents from tail gas. The liquefied constituents or liquid is withdrawn from the bottom of the separator 49 and is passed through line 50 through heat exchanger 52 and then through line 32 to the upper portion of the stabilizer 33, where the liquid which contains gasoline constituents is stabilized as will be described hereinafter in greater detail.

The liquid passing through line 32 to the top of stabilizer 33 has the following components in about the amounts given:

|  | Mol percent | Pounds per hour |
| --- | --- | --- |
| $CH_4$ | 3.3 | 53 |
| $C_2H_6$ | 3.6 | 108 |
| $C_3H_8$ | 14.6 | 490 |
| $C_4H_{10}$ | 37.8 | 1,660 |
| $C_5H_{12}$ and higher | 40.7 | 2,220 |

The stabilized product withdrawn from the bottom of the stabilizer 33 contains the following components in about the amounts given:

|  | Mol percent | Pounds per hour |
| --- | --- | --- |
| $C_4H_{10}$ | 40 | 1,100 |
| $C_5H_{12}$ and higher | 60 | 2,070 |

The gas passing overhead from the stabilizer 33 is passed through line 79 and admixed with the gaseous mixture to be treated. This overhead gas has the following composition and the amounts of the components are about as follows:

|  | Mols per hour | Pounds per hour |
|---|---|---|
| $CH_4$ | 3.5 | 56 |
| $C_2H_6$ | 3.1 | 93 |
| $C_3H_8$ | 11.1 | 488 |
| $C_4H_{10}$ | 8.4 | 487 |
| $C_5H_{12}$ and higher | 1.5 | 108 |
| Total | 27.6 | 1,232 |

The heat exchangers through which the partially cooled and dried gas passes will now be described. The partially cooled gas leaves the heat exchanger 46 through line 48 at a temperature of about 0° F. and is then passed through heat exchanger 58 where the cooled gas is indirectly contacted with refrigerant and its temperature reduced to about −30° F. To obtain this cooling the refrigerant is expanded from a pressure of about 200 lbs. per square inch to a pressure of about 10 lbs. per square inch. During this cooling process additional quantities of desired higher molecular weight hydrocarbons are liquefied. The cooled gas is then passed through heat exchanger 52 where it indirectly contacts liquid condensate from the separator 49 as above described and further liquefaction of some of the cold gas occurs. The condensate before it passes through the heat exchanger 52 is at a temperature of about −68° F. and when it leaves the heat exchanger 52 it is at a temperature of about −40° F. and it is at this temperature that the liquid to be stabilized is introduced into the upper portion of the stabilizer 33.

In passing through the heat exchanger 52 the cooled gas has its temperature lowered to about −35° F. and is then passed through the last heat exchanger 60 where it is further indirectly contacted with refrigerant which has its pressure reduced to a lower point than the pressure in the heat exchanger 58 where the first cooling with refrigerant was obtained. In this step the refrigerant is expanded from a pressure of about 200 lbs. per square inch to a pressure of about 2.5 lbs. per square inch and a greater degree of refrigeration is obtained. By using a plurality of refrigerant expansion stages better cooling is obtained and lower temperatures are preferably utilized in the last refrigerant expansion step to produce a better separation of desired hydrocarbon constituents from the gas being treated. The refrigerant cools the gas to a temperature of about −68° F. to liquefy substantially all of the desired constituents of the cold gas and all the liquefied constituents and gas are introduced into the separator 49 as above described. The refrigeration cycle will be hereinafter described in greater detail.

While the drawing shows the heat exchangers as being arranged in alinement and in a single unit, it is to be understood that separate heat exchangers may be used. Furthermore, the line 48 has been diagrammatically shown as extending through the heat exchangers in a straight line and it is to be understood that other forms, such as coils may be used in order to increase the area of contact between the gas to be cooled and the cooling mediums. While the exchangers have been shown in alinement and in an unitary construction, it is to be understood that each heat exchanger is separate from the other heat exchanger and there is no communication between the cooling mediums in the various heat exchangers. For this example to obtain the desired refrigeration about 3,463 lbs. per hour of ammonia are required to be circulated.

The liquefied constituents withdrawn from the collector 49 and any liquid condensate from drum 25 are introduced into the upper portion of the stabilizer 33 which is preferably provided with a plurality of plates 68. If desired, the liquid condensate containing hydrocarbons may be separately introduced into the stabilizer 33 through line 31 at a lower point. The liquefied constituents are introduced into the stabilizer at a temperature of about −40° F. and as they pass downwardly through the stabilizer and over the plates 68, the liquefied constituents become heated by rising warm vapors and volatile constituents are removed from the liquefied constituents to separate a stabilized product which is withdrawn from the bottom of the stabilizer through valved outlet 70. Liquid is withdrawn from the bottom plate in the stabilizer through line 74, passed through a reboiler 76 and returned to the bottom portion of the stabilizer through line 78 to remove undesired volatile constituents from the stabilized product. The stabilizer 33 is maintained under a pressure of about 10 lbs. per square inch and the bottom portion of the stabilizer is maintained at a temperature of about 110° F. The reboiler 76 may be heated in any suitable manner, as, for example, by steam or hot water.

The separated volatile constituents leave the upper portion of the stabilizer at a temperature of about +40° F. and are passed through line 79 and introduced into line 18 where they are mixed with the gas feed before it is compressed by compressor 20. By using a low pressure and low temperature stabilizer according to this invention it is possible to operate a stabilizer without a condenser and the vapors and gases leaving the top of the stabilizer are recycled through the process.

The tail gas which is separated in the separator 49 has about the following composition and the amounts of the components are as given:

|  | Mol per cent | Pounds per hour |
|---|---|---|
| $CH_4$ | 86.84 | 17,650 |
| $C_2H_6$ | 7.40 | 2,810 |
| $C_3H_8$ | 4.06 | 2,270 |
| $C_4H_{10}$ | 1.50 | 1,200 |
| $C_5H_{12}$ and higher | 0.20 | 220 |
|  |  | 24,150 |

The tail gas leaves the separator at a temperature of about −68° F. and is passed through line 82 and heat exchanger 84 wherein it is indirectly contacted with refrigerant under pressure to cool the refrigerant to about −50° F. The tail gas leaves the heat exchanger 84 through line 86 at a temperature of about −30° F., and is then passed through heat exchangers 46 and 24 as above described wherein it is heated and leaves the heat exchanger 24 after indirect contact with the compressed charge of gaseous feed at a temperature of about 90° F. The tail gas leaves the system through line 90 and may be either burned or otherwise disposed of in any suitable manner. A part or all of the tail gas passing through line 90 may be used to revivify or dry out some of the drying agent which has been used in the driers as will be pointed out hereinafter in greater detail.

In the drawing there is shown a plurality of driers and with this arrangement one drier can be used while another drier may be revivified so that a fresh drier will be available at all times. For example, after the absorbing or drying agent 39 in drier 38 has absorbed a quantity of water and its drying or absorbing capacity has decreased, the valves 36 and 42 are closed and drier 38 is taken out of the system. Usually each drier is maintained in service for 12 hours and is then revivified. The gas to be dried is passed through line 92 having valve 94 and passed through the other drier 95 provided with a drying agent 96. The dried gas is withdrawn from the drier 95 and passed through line 97 having valve 98 and the dried gas is then passed through lines 44 and 48 and the series of heat exchangers as above described. Drying agent 39 in drier 38 is then revivified by passing tail gas therethrough as will be described hereinafter in greater detail. Each drier contains about 21,600 lbs. of alumina. In the example given about 72 lbs. of water per hour were absorbed by the alumina from the gaseous mixture being treated.

The refrigeration system will now be described. A refrigerant receiver 100 is provided with a suitable refrigerant under pressure such as ammonia, propane or the like, but in this invention ammonia is preferred. The refrigerant may be introduced into the receiver 100 through valved line 102 provided with pump 104. During the operation of the process the refrigerant in the receiver 100 is at a temperature of about 100° F. and under a pressure of about 197 lbs. per square inch. The refrigerant is withdrawn from the bottom of the receiver 100 and passed through line 106 through heat exchanger 84 where it is indirectly contacted with tail gas as above described and its temperature is reduced to about —50° F. A portion of the cooled refrigerant is passed through line 108 to heat exchanger 58 and another portion is passed through line 110 to heat exchanger 60.

The line 108 is provided with pressure reducing valve 112 so that the pressure on the refrigerant is reduced before the refrigerant is introduced into heat exchanger 58 and the gas passing through line 48 in heat exchanger 58 has its temperature reduced to a relatively low temperature as above described. The expanded refrigerant is withdrawn as a vapor from the heat exchanger 58 and is passed through line 114 and introduced into a collecting chamber 116 at a temperature of about —40° F. The collecting chamber 116 is provided with a valved outlet 118 for drainage purposes or the like, and an overhead line 120 for returning the expanded refrigerant to the compression stages. The refrigerant under lower pressure passes through line 120 and through compressor 122, line 123 and then through compressor 124 and the compressed refrigerant under about 205 lbs. per square inch is then passed through a cooler 126 after which it is introduced into the refrigerant receiver 100 at a temperature of about 100° F. After the refrigerant has passed through compressor 122 its pressure has been increased to about 33 lbs. per square inch and after having passed through the second compressor 124 its pressure is further increased to about 205 lbs. per square inch. Instead of using two compressors, a single compressor may be used. The pressure of the refrigerant in receiver 100 is about 197 lbs. per square inch.

The other portion of the refrigerant from line 106 is passed through line 110 having a pressure reducing valve 128 whereby the pressure on the refrigerant is reduced to a lower extent than the pressure on the refrigerant passing through the first mentioned pressure reducing valve 112. By this expansion the refrigerant passing through line 110 is cooled to a greater extent than the portion of refrigerant expanded in heat exchanger 58. The expanded and cooled refrigerant is passed through the last heat exchanger 60 for indirectly contacting the cold gas before it is introduced into separator 49.

The expanded refrigerant is passed from the heat exchanger 60 through line 130 and introduced into a second collecting chamber 132 having a valved line 134 at the bottom thereof for drainage purposes or the like. In this expansion the pressure on the refrigerant is reduced to about 2½ lbs. per square inch and the refrigerant introduced into the collecting chamber 132 is at about —80° F. The expanded refrigerant under the lower pressure is withdrawn from the second collecting chamber 132 and passed through line 136 and a compressor 138. As the pressure on the refrigerant in the collecting chamber 132 is less than the pressure on the refrigerant in collecting chamber 116, it is necessary to raise the pressure of the refrigerant from collecting chamber 132 before it is mixed with the refrigerant from collecting chamber 116 and it is, therefore, passed through the compressor 138 and then mixed with the refrigerant from collecting chamber 116 passing through line 120. The mixture of refrigerants is then passed through compressors 122 and 124 and then introduced into receiver 100 after cooling in cooler 126.

Valved line 142 connects line 106 with line 123 and valved line 144 connects line 106 with line 120. The main purpose of these lines 142 and 144 is to desuperheat vapors entering the compressor cylinders of compressors 122 and 124 by injection and evaporation of liquid ammonia. In this way horsepower necessary for the compressors and compressor displacement is reduced. Valved lines 142 and 144 may also be used to build up or maintain pressure on the refrigerant in receiver 100.

The tail gas after having passed through heat exchanger 24 may be used to revivify or reactivate the drying agents 39 and 96 in the driers 38 and 95. For example, if the drier 38 has been used for some time and the drying agent 39 becomes inactive by absorption of moisture, valves 36 and 42 are closed and valves 94 and 98 in connection with drier 95 are opened so that the gas to be dried is passed through drier 95 instead of drier 38. The valve 145 in exit line 90 is closed and the tail gas which is substantially dry and at a temperature of about 90° F. is passed through line 146 and heater 147 in order to further heat the tail gas, if desired. In some instances the heating coil 147 may be omitted. Valve 148 in line 150 is opened and valve 152 in line 156 is opened so that the tail gas is passed through line 150, drier 38, line 156 and line 160 which communicates with the exit line 90 beyond the valve 145. After the drying agent 39 in drier 38 has been reactivated and after drier 95 has been rendered inactive by absorption of water, the drier 95 is taken out of the system and drier 38 is put back into the system and the drier 95 is then reactivated. A line 164 provided with valve 166 communicates with the upper portion of the drier 95 and a line 168 provided with valve 170 communicates with the bottom portion of the drier 95. After closing valve 148 and valve 152, valves 166 and 170 are opened so that tail gas passing through line 146 is passed through line 164, drier 95 and leaves the drier through lines 168, 172 and 160 and is introduced into the line 90 beyond the valve 145.

Instead of using natural gas from wells, other gases containing higher molecular weight hydrocarbons may be used and treated according to this invention. Gases may be treated to recover $C_3$ and $C_4$ hydrocarbons therefrom to produce a feed stock for a conversion unit such as a polymerization unit.

The stabilized product withdrawn from the bottom of stabilizer 33 comprises a natural or casinghead gasoline and may be blended with other gasolines or may be further treated as desired.

Where our invention is used to recover $C_3$ and $C_4$ hydrocarbons from gaseous mixtures containing hydrocarbons, such as bubble tower separator gas, for example, the stabilizer 33 is preferably replaced by a fractionating tower. The liquefied hydrocarbons passing through line 32 are introduced into such a fractionating tower and fractionated to separate a desired $C_3$—$C_4$ fraction which may be passed to a conversion zone such as a polymerization zone or the like.

While specific operating conditions and specific temperatures and pressures have been given, it is to be understood that this is by way of example only and that the invention is not to be restricted thereto. Where different gaseous feeds are treated, different temperatures and pressures may be necessary. Also the temperatures and pressures given above may be varied without departing from the spirit of the invention.

We claim:

1. A method of treating gaseous mixtures containing hydrocarbons to separate desirable higher molecular weight hydrocarbons therefrom which comprises cooling a mixture of gases under relatively low pressure to a relatively low temperature but above the freezing point of water to condense and remove water from the gases, drying the cooled gases to remove substantially all the remaining water therefrom, then passing the dried gases as a stream through a series of heat exchangers to reduce the temperature of the cooled and dried gas to a relatively low temperature and to liquefy higher molecular weight hydrocarbons, separating liquefied hydrocarbons from cold gases in a separator, passing at least a portion of the cold, separated gases from said separator through one of said heat exchangers for cooling the dried gas, expanding a refrigerant in the next heat exchanger in order to lower the temperature of the liq-dried gas, passing at least a portion of the liquefied hydrocarbons through the next heat exchanger in indirect contact with the dried gas to further lower the temperature of the dried gas and expanding a refrigerant in the last heat exchanger to further cool the dried gas by indirect heat exchange and to liquefy substantially all the desired hydrocarbon constituents.

2. A method as defined in claim 1 wherein the liquefied hydrocarbons after passing through one of said heat exchangers are introduced into a stabilizer to remove undesired volatile constituents from the liquefied hydrocarbons.

3. A method as defined in claim 1 wherein the liquefied hydrocarbons after passing through one of said heat exchangers are introduced into a stabilizer and maintained therein under a pressure of about 10 lbs. per square inch and a relatively low temperature to separate volatile constituents from the liquefied hydrocarbons and mixing the separated volatile constituents with the mixture of gases to be treated in the method.

4. A method as defined in claim 1 wherein the cold, separated gases from said separator after passing through one of said heat exchangers are passed in indirect contact with the gases at the beginning of the method to cool the gases to a relatively low temperature above the freezing point of water.

5. A method as defined in claim 1 wherein the refrigerant in the last heat exchanger is expanded to a lower pressure than the refrigerant in the other heat exchanger to produce a lower temperature and to liquefy substantially all of the desired hydrocarbons from the gases to be treated.

6. A method as defined in claim 1 wherein the portions of refrigerant to be expanded in the heat exchangers are withdrawn from a common receiver and one portion of the refrigerant is expanded to a lower pressure than the other portion of refrigerant.

7. A method as defined in claim 1 wherein the refrigerant to be expanded in the heat exchangers is withdrawn from a common receiver and before being passed to the heat exchangers for expansion and indirect contact with the gases to be treated the refrigerant is indirectly contacted with the cold, separated gases leaving said separator to chill the refrigerant.

8. A method of treating gaseous mixtures containing hydrocarbons to separate desirable hydrocarbons therefrom which comprises cooling a mixture of gases under relatively low pressure to a relatively low temperature but above the freezing point of water to condense and remove water from the gases, drying the cooled gases to remove substantially all the remaining water therefrom, then passing the dried gases as a stream through a series of heat exchangers to reduce the temperature of the cooled and dried gas to a relatively low temperature and liquefy portions thereof and separating liquefied hydrocarbons from cold gases in a separator, using the liquefied hydrocarbons in one of the heat exchangers for cooling the dried gas, using the cold gases from said separator in another of the heat exchangers for cooling the dried gas and expanding portions of a refrigerant in other heat exchangers to lower the temperature of the stream of dried gas to liquefy desirable constituents thereof, the portion of refrigerant expanded in one of said heat exchangers being expanded to a lower pressure than the portion of refrigerant expanded in another of said heat exchangers.

9. In a method of separating desired hydrocarbon constituents from gaseous mixtures containing hydrocarbon gases wherein a gas under pressure is cooled and then dried to remove substantially all the water therefrom, the steps of passing the cooled and dried gas as a stream through a series of heat exchangers to reduce the gas to a relatively low temperature to liquefy hydrocarbon constituents, separating liquefied constituents from cold gases in a separator, passing the cold separated gases through one of said heat exchangers in indirect contact with the dried gases to reduce the temperature of the cold, dried gases, withdrawing refrigerant from a common receiver and cooling the refrigerant by indirect heat exchange with the cold gases from said separator, expanding a portion of the cold refrigerant in a second heat exchanger to a relatively low pressure in order to further reduce the temperature of the cold, dried gas passing through the series of heat exchangers, expanding a third portion of the cold refrigerant in another heat exchanger to a lower pressure than the pressure of the expanded refrigerant in said second heat exchanger to further reduce the temperature of the cold, dried gas to liquefy substantially all the desired hydrocarbon constituents, and compressing and cooling the expanded refrigerant and passing it to said common receiver.

10. In a method of separating desired hydrocarbon constituents from gaseous mixtures containing hydrocarbon gases wherein a gas under relatively low pressure is cooled and then dried to remove substantially all the water therefrom, the steps of passing the cooled and dried gas as a stream through a series of heat exchangers to reduce the dried gas to a relatively low temperature to liquefy desired hydrocarbons, separating liquefied hydrocarbons from cold gases, passing the cold, separated gases through one of said heat exchangers in indirect contact with the dried gas, withdrawing a refrigerant from a common receiver, expanding a portion of the refrigerant in a second of said heat exchangers to reduce the temperature of the dried gas passing through the series of heat exchangers, expanding another portion of the refrigerant into a third of said heat heat exchangers to a lower pressure than the pressure of the expanded refrigerant in said second heat exchanger to further reduce the temperature of the dried gas to liquefy substantially all the desired hydrocarbon constituents.

11. In a method of separating desired hydrocarbon constituents from gaseous mixtures containing hydrocarbon gases wherein a gas under relatively low pressure is cooled and then dried to remove substantially all the water therefrom, the steps of passing the cooled and dried gas through a series of heat exchangers to reduce the gas to a relatively low temperature to liquefy desired hydrocarbons, separating liquefied constituents from cold gases, expanding a refrigerant in one of said heat exchangers to reduce the temperature of the dried gas passing through the series of heat exchangers, and expanding another portion of refrigerant in the last heat exchanger to a lower pressure than the pressure of the expanded refrigerant in said other heat exchanger to further reduce the temperature of the cold gas and to liquefy substantially all the desired hydrocarbon constituents.

12. A method as defined in claim 11 wherein the expanded refrigerants are compressed and cooled and returned to a common receiver.

13. A method as defined in claim 11 wherein the expanded portions of refrigerant are compressed and cooled and then further cooled by indirect contact with cold gases separated from the liquefied constituents before passing portions of the refrigerant through the heat exchangers to cool the dried gas.

14. A method for separating desired hydrocarbons from gaseous mixtures which comprises compressing and cooling a gaseous mixture, drying the cooled gaseous mixture by passing it through a drier, then further cooling the dried gaseous mixture by indirect contact with a refrigerant to liquefy some hydrocarbons, passing the cooled and dried gaseous mixture to a collecting drum to separate liquefied constituents from cold gases, using the liquefied constituents to cool the dried gaseous mixture before it is introduced into said collecting drum and using the cold gases separated in said collecting drum for cooling the dried gas as it leaves said drier, passing the liquefied constituents into the upper portion of a stabilizing zone wherein the liquefied product is stabilized and withdrawn from the bottom thereof, the separated volatile constituents removed from the liquefied constituents in said stabilizer zone being recycled and mixed with the gaseous mixture for further treatment.

15. A method of treating a gaseous mixture containing hydrocarbons to separate hydrocarbons therefrom which comprises cooling said mixture to a relatively low temperature but not below the freezing point of water to condense and remove water therefrom, contacting the mixture with a drying agent to remove substantially all remaining water from the mixture, then further cooling the dehydrated mixture to liquefy a portion of the hydrocarbons contained therein, separating cold liquefied hydrocarbons from cold residual gases, using said cold liquefied hydrocarbons and said cold residual gases to cool by indirect heat exchange said gaseous mixture undergoing treatment, and using a refrigerant to cool said gaseous mixture undergoing treatment, said refrigerant having been cooled by indirect heat exchange with said cold residual gases.

16. A method as in claim 15 including the steps of fractionally distilling said liquefied hydrocarbons subsequent to their indirect heat exchange with said mixture to separate volatile constituents therefrom and combining said volatile constituents with additional quantities of said hydrocarbon mixture to be treated.

17. A method of treating a gaseous mixture containing hydrocarbons to separate hydrocarbons therefrom which comprises cooling said mixture to a relatively low temperature but not below the freezing point of water to condense and remove water therefrom, contacting the mixture with a drying agent to remove substantially all remaining water from the mixture, then cooling the dehydrated mixture further to liquefy a portion of the hydrocarbons contained therein, separating cold liquefied hydrocarbons from cold residual gases, utilizing said cold residual gases to effect said cooling of said gaseous mixture after said contact with said drying agent and to cool said gaseous mixture prior to said contact, and utilizing said cold liquefied hydrocarbons to cool said gaseous mixture after said contact with said drying agent.

18. A method of treating a gaseous mixture containing hydrocarbons to separate hydrocarbons therefrom which comprises cooling said mixture to a relatively low temperature but not below the freezing point of water to condense and remove water therefrom, contacting the mixture with a drying agent to remove substantially all remaining water from the mixture, then cooling the dehydrated mixture further to liquefy a portion of the hydrocarbons contained therein, separating cold liquefied hydrocarbons from cold residual gases and utilizing at least a part of said cold residual gases to effect said cooling of said gaseous mixture after contact with said drying agent and to cool said gaseous mixture prior to said contact.

19. A process for separating heavier normally gaseous hydrocarbons from a hydrocarbon mixture comprising normally gaseous hydrocarbons wherein a hydrocarbon mixture comprising normally gaseous hydrocarbons is passed through a drying zone, passing said dried hydrocarbon mixture through a cooling zone wherein it is indirectly contacted with a liquefied refrigerant maintained under high pressure to cool said hydrocarbon mixture and condense heavier hydrocarbons therefrom, said refrigerant being vaporized at least in part during the cooling process, passing said hydrocarbon mixture through a second cooling zone wherein it is indirectly contacted with a liquefied refrigerant maintained under lower pressure than said refrigerant in said first cooling zone to further cool said hydrocarbon mixture and condense additional heavier hydrocarbons therefrom, said refrigerant being vaporized at least in part during said cooling process in said second cooling zone, separating said condensed heavier hydrocarbons from cooled uncondensed hydrocarbon gases, withdrawing vaporized refrigerant from said cooling zones, compressing said vaporized refrigerant to a high pressure, cooling said compressed refrigerant to liquefy it, further cooling said liquefied refrigerant by indirect contact with said cooled uncondensed hydrocarbon gases and using said cooled liquefied refrigerant as the refrigerant in said cooling zones.

PERCIVAL C. KEITH, JR.
LUTHER R. HILL.
GORDON J. ROBERTSON.